June 19, 1962 W. L. CARLSON ETAL 3,039,798
CRANK ASSEMBLY AND METHOD OF ATTACHING
CYLINDRICAL MEMBER TO SHAFT
Filed July 20, 1959

INVENTORS
Wilbur L. Carlson
BY Arthur T. Gregg

Their Attorney

10 # United States Patent Office 3,039,798
Patented June 19, 1962

3,039,798
CRANK ASSEMBLY AND METHOD OF ATTACHING CYLINDRICAL MEMBER TO SHAFT
Wilbur L. Carlson and Arthur T. Gregg, Rochester, N.Y., assignors to General Motors Corporation, Detroit, Mich., a corporation of Delaware
Filed July 20, 1959, Ser. No. 828,324
11 Claims. (Cl. 287—20.3)

This invention pertains to an article of manufacture, and particularly to crank assemblies and an improved method of attaching shafts or pins to arms.

Windshield wiper mechanisms for vehicles include several crank assemblies, such as the pivot shafts and crank arms, and the crank arms and crank pins. Heretofore, it has been the practice to connect the shafts and arms, or the pins and the arms, by pressing a knurled portion of a pin or shaft through the arm and either peening over the end of the pin or shaft, or hot upsetting the end of the pin or shaft. While this type of assembly is satisfactory for small loads, the torsional requirements of these assemblies for the loads encountered with fifteen inch wiper blades cannot be met. The present invention relates to welded pin and arm, or shaft and arm, assemblies, and a method of welding pins or shafts to arms so that the joint therebetween will withstand a torque load of 250 inch pounds for at least 1,000,000 cycles. Accordingly, among our objects are the provision of an improved method of attaching pins, or shafts, to arms; the further provision of improved arm and pin, or arm and shaft assemblies wherein the pins or shafts are both fusion welded and hot upset; and the still further provision of a method of attaching pins or shafts to arms including the steps of welding and hot upsetting.

The aforementioned and other objects are accomplished in the present invention utilizing coaxial electrodes, each electrode engaging one of the parts to be resistance welded. Specifically, the arms are formed with circular holes adapted to receive the ends of the pins or shafts. The pins or shafts are formed with end portions of different diameter so as to define an abrupt shoulder adapted to engage the underside of the arm. The smaller diameter portions of the pins or shafts are knurled, the outer diameter of the knurls being slightly greater than the diameter of the circular hole in the arm.

The pins or shafts are first press fitted into the circular holes in the arms to properly locate the pins or shafts relative to the arms. Thereafter, the assemblies are placed in a fixture and the coaxial welding electrodes are moved into engagement therewith. The coaxial welding electrodes comprise a cylindrical center electrode adapted to engage the protruding end of the pin or shaft, and an annular electrode surrounding the cylindrical electrode and adapted to engage the arm. The annular electrode is spring biased into engagement with the arm, and the cylindrical center electrode is adapted to be urged under pressure against the protruding end of the pin or shaft by any suitable means, such as a hydraulic ram. The coaxial electrodes are connected to a suitable source of alternating current so that the current flowing radially between the two electrodes through the arm and the pin or shaft quickly brings the upper end of the pin or shaft and a localized area of the arm up to the fusion temperature. When the projecting end of the pin or shaft is at the fusion temperature, the downward force on the center electrode upsets the end thereof so as to produce a ring weld between the hot upset end of the pin or shaft and the arm. A ring weld is also formed between the upper end reduced diameter portion of the pin or shaft and the arm.

Further objects and advantages of the present invention will be apparent from the following description, reference being had to the accompanying drawings, wherein a preferred embodiment of the present invention is clearly shown.

Figure 1:
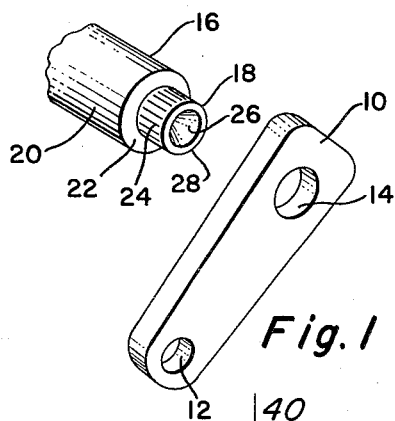
FIGURE 1 is a fragmentary perspective view of a pin and a plate prior to assembly.

With particular reference to FIGURE 1, an arm or plate 10 is shown having a pair of circular apertures 12 and 14 adapted to receive pins or shafts. Numeral 16 depicts a pin or shaft which is to be assembled with the arm or plate 10. The pin or shaft 16 is formed with portions 18 and 20 of different diameter which define an annular shoulder 22, the surface of which lies in a plane substantially normal to the axis of the pin or shaft. The smaller diameter portion 18 is knurled, as indicated by numeral 24, and the end thereof is formed with a conical recess 26.

While the disclosed article of manufacture comprises a pin and plate, or a shaft and arm, this is only by way of example and is not to be construed by way of limitation. It is readily apparent that the method of attachment can be used to advantage in the assembly of any article having two or more parts which are subjected to torsional loads of substantial magnitude.

Figure 2:
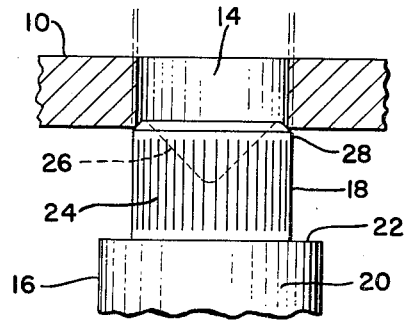
FIGURE 2 is a fragmentary sectional view depicting the manner in which the pins or shafts are located relative to the arms.

The pin 16 depicted in FIGURE 1 is adapted to be inserted through the circular aperture 14 of the arm 10. The diameter of the aperture 14 is substantially equal to the smaller diameter portion 18 of the pin 16. However, the outer diameter of the knurled section 24 is greater than the diameter of the aperture 14. This is necessary to properly locate the pins or shafts relative to the arms or plates prior to attaching them according to the disclosed method. Initially, the pins or shafts are press fitted into the circular apertures of the plates or arms, and in so doing the pins or shafts are properly located as shown in FIGURE 2. As seen in FIGURE 2, when the pin, or shaft, is press fitted into the circular aperture in the plate, or arm, the end portion 28 of the pin or shaft projects above the upper surface of the plate or arm. In other words, the axial length of the smaller diameter portion 18 is greater than the thickness of the plate or arm to which it is to be attached.

Figure 3:
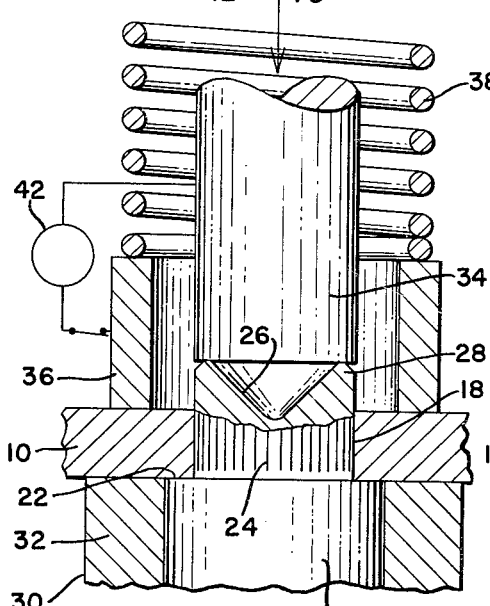
FIGURE 3 is a fragmentary sectional view of the assembly and welding electrodes.

After the pin or shaft is press fitted into the circular aperture in the plate or arm the parts are transferred to a welding fixture 30 as shown in FIGURE 3. The welding fixture 30 includes a recess, or nest, 32 for receiving the larger diameter portion 20 of the pin or shaft. Thereafter, coaxial welding electrodes 34 or 36 are brought into engagement with the assembly. Welding electrode 34 is substantially cylindrical, and the end thereof engages the protruding end 28 of the pin or shaft 16. Welding electrode 36 is annular and coaxial with the cylindrical electrode 34. The annular electrode 36 is radially spaced from the cylindrical electrode 34 and engages the plate or arm 10.

The annular electrode 36 is maintained in engagement with the plate or arm 10 by means of a spring, such as indicated by numeral 38. The cylindrical electrode 34 is connected to a suitable hydraulic ram, not shown, which forces the center electrode 34 downwardly in the direction of arrow 40. Electrodes 34 and 36 are connected to a suitable source of alternating current, such as indicated by numeral 42. When the electrodes 34 and 36 engage the pin and arm respectively, a circuit is completed and current flows radially between the two electrodes through an annular portion of the arm circumscribing the aperture 14 and through the pin 16. This current flow causes resistance heating of the steel arm and steel pin and quickly raises these parts to the fusion temperature.

Figure 4:
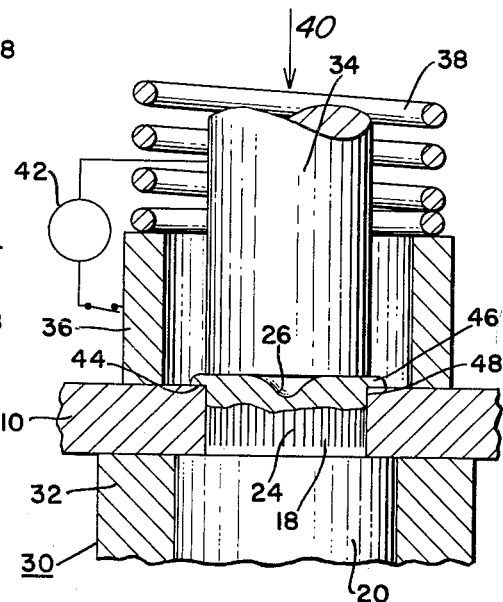
FIGURE 4 is a fragmentary sectional view indicating the step of hot upsetting the protruding end of the pin or shaft.

As seen in FIGURE 4, as the projecting end 28 of the pin 16 is brought up to the fushion temperature the pressure on the center electrode 34 in the direction of arrow 40 upsets the end thereof so as to produce an annular, or ring, weld 44 between the upset portion 46 and the arm 10. In addition, a ring weld 48 is produced between the smaller diameter portion 18 of the pin and the inner surface of the aperture 14 in the arm.

Figure 5:
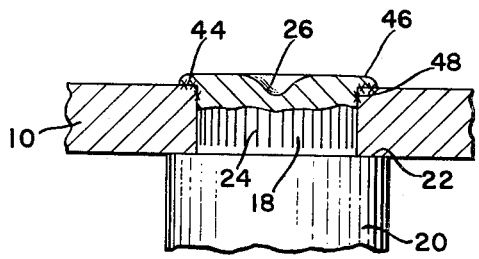
FIGURE 5 is a fragmentary sectional view of the welded joint between the pin or shaft and the arm produced by practicing the method of this invention.

The completed article of manufacture, or pin and arm assembly, is depicted in FIGURE 5. The shoulder 22 engages the lower side of the plate 10 and upset portion 46 engages and is welded to the upper side of the plate 10 so as to prevent relative movement between the plate and the pin along the axis of the pin. The ring weld 48 between the pin and the plate as well as the ring weld 44 between the upset end 46 and the plate prevent relative rotary movement between the pin and the plate. The finished surface of the larger diameter portion 20 of the pin or shaft is not deformed during the welding and upsetting operations. The resulting joints between the pin or shaft and the plate or arm will withstand a torque load of substantial magnitude. In addition, tests have indicated that a failure of the asembly due to excessive torque loads will be caused by shearing of the pin or shaft rather than destruction of the joint between the pin or shaft and the plate or arm.

While the embodiment of the invention as herein disclosed constitutes a preferred form, it is to be understood that other forms might be adopted.

What is claimed is as follows:

1. As an article of manufacture, a first member having a circular aperture therein and a cylindrical member having portions of different diameter defining an abrupt shoulder, the smaller diameter portion of said cylindrical member extending through and having a press fit in the aperture of said flat member with the end thereof projecting beyond one surface of said flat member and the shoulder in engagement with the opposite surface of the flat member, a ring weld between the smaller diameter portion of said cylindrical member and said flat member, an upset portion on the projecting end of said cylindrical member, and a weld between the upset portion of the cylindrical member and said one surface of said flat member.

2. A crank assembly including, a crank arm having a circular aperture therein and a cylindrical member having portions of different diameter defining an abrupt shoulder, the smaller diameter portion of said cylindrical member extending through and having a press fit in said aperture with the end protruding beyond one surface of said arm, the shoulder being in engagement with the opposite surface of said arm, a ring weld between the smaller diameter portion of said cylindrical member and said arm, and an upset portion on the protruding end of said cylindrical member.

3. The method of attaching a cylindrical member to a flat member, the flat member having a circular aperture for receiving the cylindrical member, including the steps of press fitting the cylindrical member within the aperture of the flat member with the end of the cylindrical member projecting above the surface of the flat member, engaging the cylindrical member and the flat member with coaxial welding electrodes, passing an electric current radially between said electrodes through a localized area of said flat member circumscribing said aperture and said cylindrical member to produce a ring weld between said cylindrical member and said flat member, and applying pressure to the electrode in engagement with said cylindrical member while said electric current is passing between said electrodes to upset the projecting end of the cylindrical member and weld the upset portion to the surface of said flat member.

4. The method of attaching a first member to a second member, the second member having an aperture for receiving the first member, including the steps of press fitting the first member within the aperture of the second member with the end of the first member projecting above the surface of the second member, passing an electric current radially between the end of said first member and localized area of said second member surrounding said aperture to produce a weld between said members, and upsetting the projecting end of said first member and simultaneously welding the upset portion to the surface of said second member.

5. The method of welding a pin to a plate, the plate having an aperture for receiving the pin, the pin having an intermediate shoulder of greater cross-sectional area than the area of said aperture, including the steps of press fitting the pin within the aperture with the shoulder in engagement with one surface of said plate and the end of the pin projecting above the other surface of said plate, passing an electric current radially between said pin and a localized area of said plate surrounding said aperture to produce a ring weld between the pin and the plate, and upsetting the projecting end of said pin and simultaneously producing a weld between the upset portion and the opposite surface of said plate.

6. The method of attaching a cylindrical member to a flat member, the cylindrical member having portions of different diameter defining an abrupt shoulder, the flat member having a circular aperture for receiving the smaller diameter portion of said cylindrical member, including the steps of press fitting the smaller diameter portion of the cylindrical member within the aperture of the flat member with the shoulder in engagement with one surface of said flat member and the end of the cylindrical member projecting above the opposite surface of the flat member, engaging the cylindrical member and the flat member with coaxial welding electrodes, passing an electric current radially between said electrodes through said cylindrical member and a localized area of said flat member circumscribing said aperture to produce a ring weld between the cylindrical member and the flat member, and upsetting the projecting end of the cylindrical member and simultaneously welding the upset portion to the opposite surface of said flat member.

7. The method of attaching a cylindrical member to a flat member, the cylindrical member having portions of different diameter defining an abrupt shoulder, the flat member having a circular aperture for receiving the smaller diameter portion of said cylindrical member, including the steps of press fitting the smaller diameter portion of the cylindrical member within the aperture of the flat member with the shoulder in engagement with one surface of the flat member and the end of the cylindrical member projecting beyond the opposite surface of said flat member, engaging the projecting end of the cylindrical member with a cylindrical welding electrode and engaging the plate member with an annular electrode coaxial with the cylindrical welding electrode, passing an electric current radially between said electrodes through the cylindrical member and a localized area of the flat member surrounding said aperture to produce a ring weld between the cylindrical member and the flat member, and applying pressure to the cylindrical electrode to upset the projecting end of the cylindrical member and simultaneously welding the upset portion to the opposite surface of said flat member.

8. A crank assembly including, a crank arm having an aperture therein and a shaft having a shoulder of greater cross-sectional area than the cross-sectional area of said aperture, the end of said shaft extending through and having a press fit in said aperture and protruding beyond one surface of said arm, the shoulder being in engagement with the opposite surface of said arm, a ring weld between the shaft and the arm, an upset portion on the protruding end of the shaft, and a weld between the upset portion and the opposite surface of said arm.

9. A crank assembly including a crank arm having a circular aperture therein and a cylindrical member having portions of different diameter defining an abrupt shoulder, the smaller diameter portion of said cylindrical member being knurled and press fitted into the aperture with the end protruding beyond one surface of the arm, the shoulder being in engagement with the opposite surface of the arm, a ring weld between the smaller diameter portion of said cylindrical member and said arm, an upset portion on the protruding end of said cylindrical member, and a weld between the upset portion and the opposite surface of said arm.

10. The crank assembly set forth in claim 9 wherein the protruding end of said cylindrical member has a substantially conical recess therein.

11. As an article of manufacture, a first member and a second member, the second member having an aperture within which the first member is press fitted, the end of the first member projecting beyond the surface of the second member, a ring weld between said members, an upset portion on the projecting end of said first member, and a weld between the upset portion and the surface of said second member.

References Cited in the file of this patent

UNITED STATES PATENTS

| | | |
|---|---|---|
| 1,261,327 | Von Henke | Apr. 2, 1918 |
| 1,330,800 | Gravell | Feb. 17, 1920 |
| 2,426,275 | Krebs | Aug. 26, 1947 |
| 2,781,442 | Flessner et al. | Feb. 12, 1957 |
| 2,885,532 | Fike | May 5, 1959 |